United States Patent
Wakatsuki et al.

(10) Patent No.: US 10,409,446 B2
(45) Date of Patent: Sep. 10, 2019

(54) INFORMATION PROCESSING APPARATUS AND METHOD FOR MANIPULATING DISPLAY POSITION OF A THREE-DIMENSIONAL IMAGE

(71) Applicant: SONY CORPORATION, Tokyo (JP)

(72) Inventors: Akira Wakatsuki, Tokyo (JP); Kaoru Hatta, Chiba (JP)

(73) Assignee: SONY CORPORATION, Tokyo (JP)

( * ) Notice: Subject to any disclaimer, the term of this patent is extended or adjusted under 35 U.S.C. 154(b) by 158 days.

(21) Appl. No.: 14/366,426

(22) PCT Filed: Jan. 8, 2013

(86) PCT No.: PCT/JP2013/050071
§ 371 (c)(1),
(2) Date: Jun. 18, 2014

(87) PCT Pub. No.: WO2013/121807
PCT Pub. Date: Aug. 22, 2013

(65) Prior Publication Data
US 2015/0234567 A1    Aug. 20, 2015

(30) Foreign Application Priority Data

Feb. 17, 2012 (JP) ................... 2012-032484

(51) Int. Cl.
*G06F 3/0481* (2013.01)
*G06F 3/01* (2006.01)
(Continued)

(52) U.S. Cl.
CPC .......... *G06F 3/04815* (2013.01); *G06F 3/017* (2013.01); *G06F 3/0482* (2013.01); *G06F 3/04842* (2013.01); *G06F 3/04845* (2013.01)

(58) Field of Classification Search
CPC ..... G06F 3/0481; G06F 3/0482; G06F 3/0484
See application file for complete search history.

(56) References Cited

U.S. PATENT DOCUMENTS

| 5,293,529 A | 3/1994 | Yoshimura et al. |
| 7,439,975 B2 * | 10/2008 | Hsu .......................... G06T 15/60 345/426 |
| 8,228,293 B2 * | 7/2012 | Dohta ..................... A63F 13/10 345/158 |

(Continued)

FOREIGN PATENT DOCUMENTS

| JP | 4-257014 A | 9/1992 |
| JP | 5-73661 A | 3/1993 |

(Continued)

OTHER PUBLICATIONS

International Search Report dated Apr. 16, 2013 in PCT/JP2013/050071.

*Primary Examiner* — David E Choi
(74) *Attorney, Agent, or Firm* — Chip Law Group

(57) ABSTRACT

An information processing apparatus according to the present technology includes an input detection unit configured to detect a position of a manipulation body for inputting manipulation in a three dimensional space, an arithmetic unit configured to identify a manipulation object image to be manipulated, from among three-dimensional images displayed on a display unit, and calculate a target display position of the manipulation object image, on the basis of a detection result by the input detection unit, and a display processing unit configured to cause the display unit to display the manipulation object image at the target display position calculated by the arithmetic unit.

14 Claims, 9 Drawing Sheets

(51) Int. Cl.
  *G06F 3/0484*    (2013.01)
  *G06F 3/0482*    (2013.01)

(56)  References Cited

U.S. PATENT DOCUMENTS

| | | | | |
|---|---|---|---|---|
| 8,558,759 | B1* | 10/2013 | Prada Gomez | G06F 3/017 345/156 |
| 2008/0209358 | A1* | 8/2008 | Yamashita | G09G 3/20 715/781 |
| 2008/0231926 | A1* | 9/2008 | Klug | G06F 3/017 359/23 |
| 2009/0228841 | A1* | 9/2009 | Hildreth | G06F 3/0304 715/863 |
| 2012/0007857 | A1* | 1/2012 | Noda | G06F 3/04812 345/419 |
| 2012/0050508 | A1* | 3/2012 | Lee | H04N 13/341 348/56 |
| 2013/0167055 | A1* | 6/2013 | Penev | G06F 3/0482 715/765 |
| 2015/0234567 | A1* | 8/2015 | Wakatsuki | G06F 3/017 715/852 |

FOREIGN PATENT DOCUMENTS

| | | |
|---|---|---|
| JP | 2004-29979 A | 1/2004 |
| JP | 2004-192294 A | 7/2004 |
| JP | 2010-252055 A | 11/2010 |

\* cited by examiner

INFORMATION PROCESSING APPARATUS AND METHOD FOR MANIPULATING DISPLAY POSITION OF A THREE-DIMENSIONAL IMAGE

TECHNICAL FIELD

The present invention relates to an information processing apparatus, an information processing method, and a computer program, in which a display position of a three-dimensional image displayed on a display unit is manipulatable.

BACKGROUND ART

In recent years, as a display device for displaying an image of a television program, a movie, a game, and the like, a display device such as a 3D display and the like which is capable of displaying a stereoscopic image presented three-dimensionally with vertical and horizontal information given with a depth feeling is becoming popular. A three-dimensional image makes a viewer to recognize a depth feeling and a stereoscopic feeling by utilizing a mechanism of a human to view an object with both eyes, in order to enable presentation of reality and presence. Further, OSD (On Screen Display) images such as a menu and an icon which are displayed with images such as for example a television program, a movie, and a game, are also three-dimensionally displayable (for example, Patent Literature 1).

CITATION LIST

Patent Literature

Patent Literature 1: JP 2010-252055A

SUMMARY OF INVENTION

Technical Problem

A three-dimensional image includes information of vertical and horizontal positions on a display surface, as well as information of a depth, as display position information of the image. Therefore, if an OSD image is displayed when a three-dimensional image is displayed, the OSD image is sometimes buried in the three-dimensional image, depending on the combination of these images. Because it is difficult to predict a case where the OSD image is buried in the three-dimensional image and adjust the display position of the OSD image, the display position needs to be adjusted at the displaying timing.

Conventionally, the display position in the depth direction, for example, of subtitle information displayed in the three-dimensional image are adjusted by a manipulation input from a dial-type manipulation unit, a finger movement on a touch panel or the like, but are allowed to be adjusted only within a limited range that is the depth direction. Therefore, it is desired to freely manipulate information in a three-dimensional image with intuitive manipulation.

Solution to Problem

According to the present disclosure, there is provided an information processing apparatus including an arithmetic unit configured to identify a manipulation object image to be manipulated, from among three-dimensional images displayed on a display unit, and calculate a target display position of the manipulation object image, on the basis of a detection result by an input detection unit configured to detect a position of a manipulation body for inputting manipulation in a three dimensional space, and a display processing unit configured to cause the display unit to display the manipulation object image at the target display position calculated by the arithmetic unit.

According to the present disclosure, the information processing apparatus identifies the manipulation object image from among the three-dimensional images displayed on the display unit on the basis of the position of the manipulation body detected by the input detection unit, and executes display processing to move the manipulation object image in response to the movement of the manipulation body. Thereby, the user can adjust the display position of a part of three-dimensional images with intuitive manipulation.

According to the present disclosure, there is also provided an information processing method including detecting a position of a manipulation body for inputting manipulation in a three dimensional space, identifying a manipulation object image to be manipulated, from among three-dimensional images displayed on a display unit, and calculating a target display position of the manipulation object image, on the basis of a detection result of the position of the manipulation body, and causing the display unit to display the manipulation object image at the calculated target display position.

According to the present disclosure, there is further provided a computer program for causing a computer to function as an information processing apparatus including an arithmetic unit configured to identify a manipulation object image to be manipulated, from among three-dimensional images displayed on a display unit, and calculate a target display position of the manipulation object image, on the basis of a detection result by an input detection unit configured to detect a position of a manipulation body for inputting manipulation in a three dimensional space, and a display processing unit configured to cause the display unit to display the manipulation object image at the target display position calculated by the arithmetic unit.

Advantageous Effects of Invention

As described above, according to the present disclosure, the information in the three-dimensional images is freely manipulatable with intuitive manipulation.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that description will be made in the next order.
1. First Embodiment (Adjustment of Display Position of Manipulation Object Image by User)
1-1. Overview of Display Device
1-2. Functional Configuration
1-3. Display Processing
2. Second Embodiment (Automatic Adjustment of Display Position of Manipulation Object Image)
2-1. Functional Configuration
2-2. Display Processing
3. Variant Example
3-1. Regarding Image that is Manipulation Object
3-2. Selection of Image that is Manipulation Object
4. Example of Hardware Configuration
<1. First Embodiment>
[1-1. Overview of Display Device]

Figure 1:
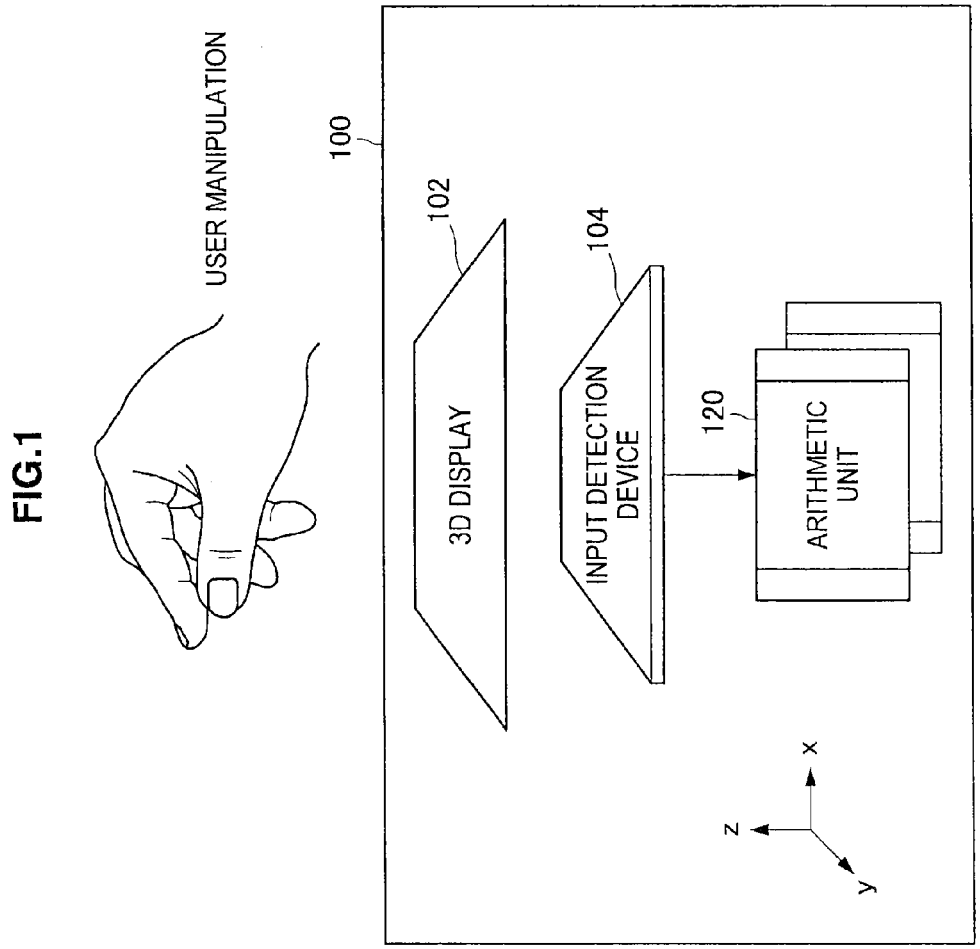
FIG. 1 is an explanatory diagram illustrating a schematic configuration of a display device including an information processing apparatus according to a first embodiment of the present disclosure.

First, a schematic configuration of a display device 100 according to the first embodiment of the present disclosure will be described with reference to FIG. 1. Note that FIG. 1 is an explanatory diagram illustrating the schematic configuration of the display device 100 according to the present embodiment.

The display device 100 according to the present embodiment is an output device including a 3D display 102 capable of displaying three-dimensional images. The display device 100 may be installed in devices having a display unit, such as for example a television, an imaging device, and the like.

The display device 100 according to the present embodiment includes an input detection device 104 for detecting a position of a manipulation body (for example, user's fingers or the like) that manipulates information displayed on the 3D display 102, relative to a display surface. The input detection device 104 is a sensor capable of detecting the position of the manipulation body relative to the input device 104, and is set at a position where information is shared with the 3D display 102 in a common position coordinate axes, in order to acquire a position relationship between the display surface of the 3D display 102 and the manipulation body. The input detection device 104 is capable of acquiring the position information of the input detection device 104 in the plane coordinates (x and y coordinates), as well as the proximity state of the manipulation body relative to the input detection device 104 as depth information (position in z direction).

The input detection device 104 acquires the position information of the manipulation body at a predetermined timing, and outputs it to an arithmetic unit 120. The arithmetic unit 120 recognizes the movement of the manipulation body on the basis of the position information of the manipulation body input from the input detection device 104. For example, the arithmetic unit 120 recognizes the manipulation input by the manipulation body, such as pinching, moving, and releasing, on the basis of change in the position information of the manipulation body.

By having the input detection device 104 capable of detecting the position of the manipulation body in the three dimensional space, the display device 100 according to the present embodiment is capable of moving the position of the image displayed stereoscopically with the manipulation body. Thereby, the user can freely adjust the display position of the image with intuitive manipulation. In the following, the configuration and the function of the display device 100 according to the present embodiment will be described in detail.

[1-2. Functional Configuration]

Figure 2:
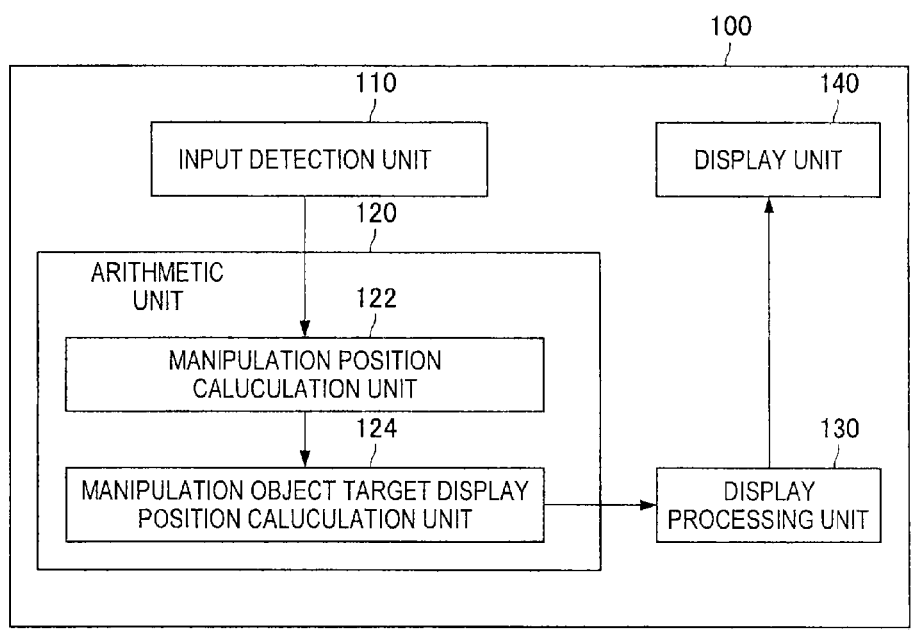
FIG. 2 is a functional block diagram illustrating a functional configuration of the display device according to the same embodiment.

First, the functional configuration of the display device 100 according to the present embodiment will be described on the basis of FIG. 2. Note that FIG. 2 is a functional block diagram illustrating the functional configuration of the display device 100 according to the present embodiment. As illustrated in FIG. 2, the display device 100 according to the present embodiment includes an input detection unit 110, an arithmetic unit 120, a display processing unit 130, and a display unit 140. In the present embodiment, the arithmetic unit 120 and the display processing unit 130 function as an information processing apparatus for executing display processing to adjust the display position of the three-dimensional image.

The input detection unit 110 detects the position of the manipulation body, which manipulates the information displayed on the display unit 140, relative to the display surface. The input detection unit 110 corresponds to the input detection device 104 of FIG. 1. The input detection unit 110 is capable of detecting the position information in the plane coordinates and a proximity state, relative to the detection surface of the input detection unit 110, for example, by sensing an electrical signal due to static electricity. The detection of the proximity state includes detection of a contact state. The proximity state is able to be recognized from the magnitude of the electrical signal. Note that the detection method of the proximity state of the input detection unit 110 is not limited to the example, but may be other detection methods. The input detection unit 110 outputs the detection result (for example, an electrical signal due to static electricity) to the arithmetic unit 120 at a predetermined cycle, for example at every acquisition of a detection value.

The arithmetic unit 120 identifies the position of the manipulation body on the basis of the detection result from the input detection unit 110, and calculates a target display position of the image that is the manipulation object. The arithmetic unit 120 includes a manipulation position calculation unit 122, and a manipulation object manipulation position calculation unit 124.

The manipulation position calculation unit 122 calculates the position of the manipulation body, from the detection result of the input detection unit 110. The manipulation position calculation unit 122 calculates position information in the x and y plane coordinates and a distance from the detection surface of the input detection unit 110, as manipulation position information of the manipulation body, for example, from the magnitude of the electrical signal input from the input detection unit 110. Note that the input detection unit 110 and the display unit 140 are set at positions in the common position coordinate axes where the information is able to be shared, so that the distance from the detection surface of the input detection unit 110 to the manipulation body is assumed to be the distance between the display surface of the display unit 140 and the manipulation body. The manipulation position calculation unit 122 conducts history management by recording the calculated manipulation position information of the manipulation body, in the storage unit (not illustrated in the drawings).

The manipulation position calculation unit 122 determines the action performed by the user on the basis of change in the manipulation position information of the manipulation body. The display device 100 according to the present embodiment enables the user to directly manipulate and move the displayed image. For example, the user can adjust the display position of the image, by performing the manipulation input of pinching and moving the image desired to be moved, from among the displayed images. At this time, upon recognizing the user performing the action of pinching, the manipulation position calculation unit 122 identifies the image displayed at the position of the action, as the manipulation object. Then, the manipulation position calculation unit 122 monitors the movement of the manipulation body that is in the state of the pinching action, while monitoring the releasing action after the pinching action, on the basis of the detection result of the input detection unit 110.

Note that pinching action of the user is able to be recognized at a time point when two or more manipulation body regions detected by the input detection unit 110 become one manipulation body region. Usually, the action of pinching the manipulation object is performed by contacting a thumb with a finger other than the thumb. Thereby, the performed pinching action is detected when a plurality of manipulation body regions, which are indicated by the detection result of the input detection unit 110 and show the presence of the manipulation body, become one.

When the pinching action is performed, the plurality of the manipulation body regions, which existed before pinching the manipulation object, become one manipulation body region smaller than the former.

Upon recognizing the pinching action performed by the user, the manipulation position calculation unit 122 checks by comparing the parallax information of the display unit 140 and the manipulation position information of the manipulation body. Then, if an image is displayed at the manipulation position information of the manipulation body, the manipulation position calculation unit 122 identifies the image as the manipulation object. Upon identifying the manipulation object, the manipulation position calculation unit 122 outputs the information identifying the image of the manipulation object and the manipulation position information of the manipulation body, to the manipulation object target display position calculation unit 124. These information is continuously output to the manipulation object target display position calculation unit 124, until an action of releasing the image that the manipulation body is pinching is performed.

The manipulation object target display position calculation unit 124 calculates a position at which the image of the manipulation object is to be displayed, in response to change of the manipulation position information of the manipulation body. Upon receiving the information of the image identified as the manipulation object from the manipulation position calculation unit 122, the manipulation object target display position calculation unit 124 moves the image of the manipulation object in response to the change of the manipulation position information of the manipulation body. Thereby, by the user's pinching the image and moving the hand, manipulation of moving the image to an intended position is realized. Further, upon being notified that the user performed the action of releasing the image by the manipulation position calculation unit 122, the manipulation object target display position calculation unit 124 displays the image at the position of the manipulation body when the image was released, and fixes the display position until the next manipulation. The manipulation object target display position calculation unit 124 outputs the calculated target display position of the image of the manipulation object, to the display processing unit 130.

The image processing unit 130 executes processing in such a manner that the image is displayed at the target display position of the image of the manipulation object input from the manipulation object target display position calculation unit 124.

The image processing unit 130 outputs display information after the image processing to the display unit 140, and causes the display unit 140 to display the three-dimensional image.

The display unit 140 is an output device capable of displaying three-dimensional images, and corresponds to the 3D display 102 of FIG. 1. The display unit 140 displays the input display information in accordance with the output command of the image processing unit 130.

[1-3. Display Processing]

Figure 3:
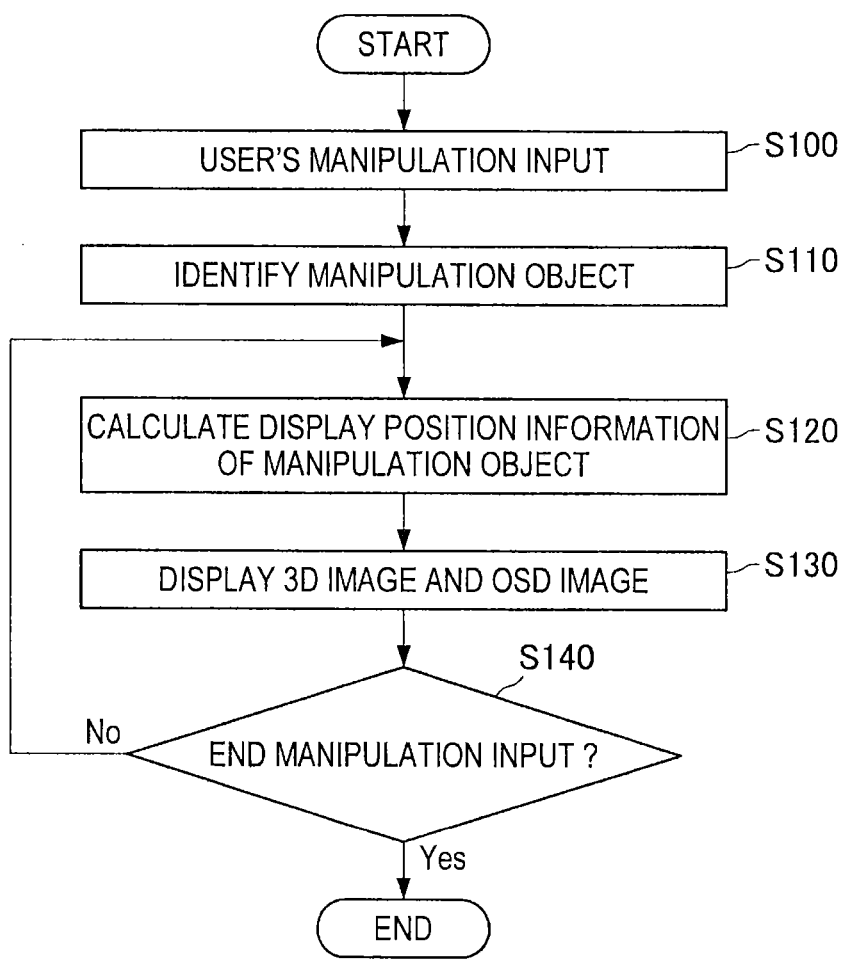
FIG. 3 is a flowchart illustrating display processing by the display device according to the same embodiment.
Figure 4:
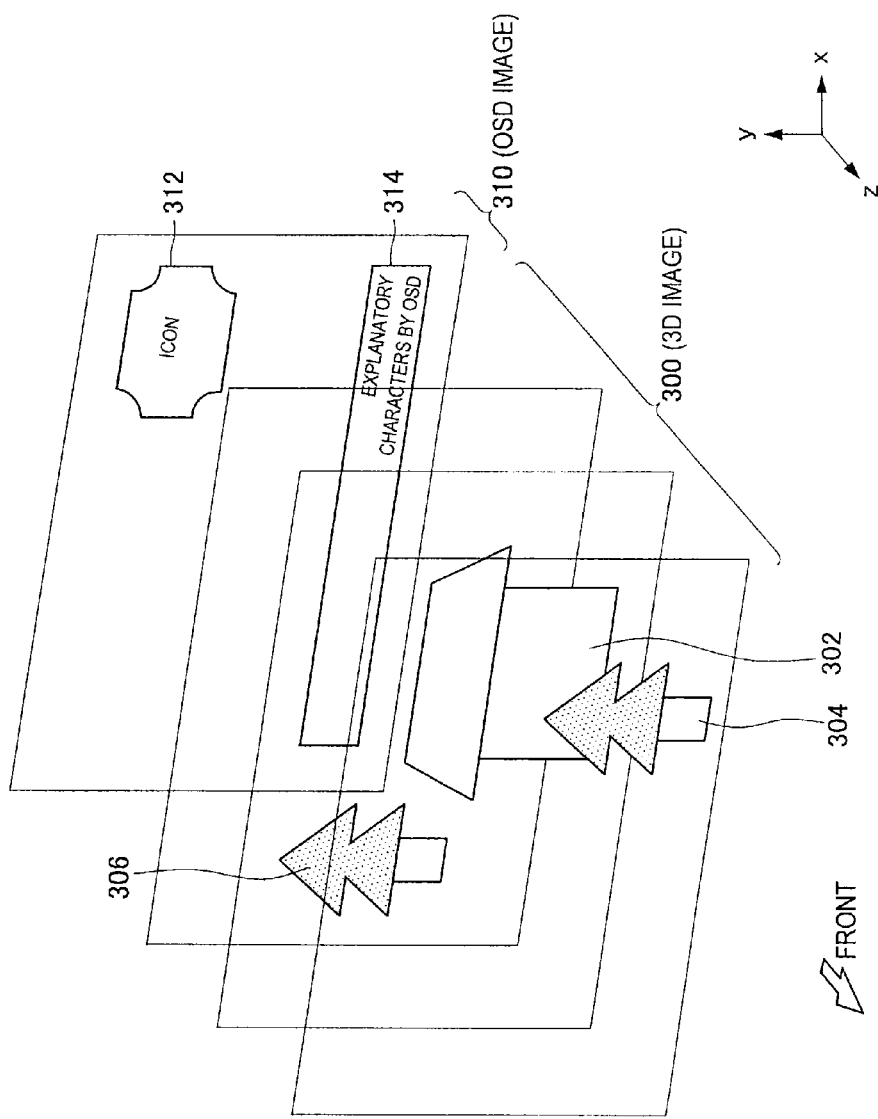
FIG. 4 is an explanatory diagram illustrating one example of three-dimensional images and the OSD images displayed on the display unit.
Figure 5:
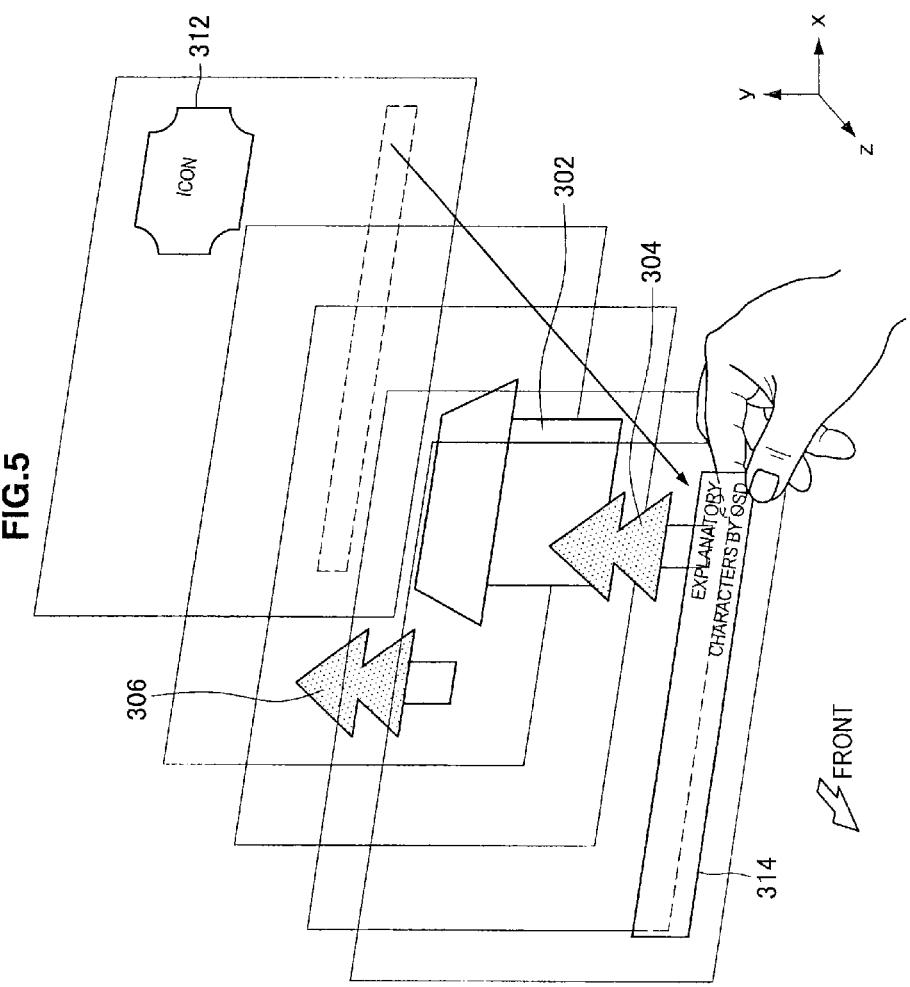
FIG. 5 is an explanatory diagram illustrating manipulation for moving a part of the OSD images of FIG. 4.

Next, the display processing by the display device 100 according to the present embodiment will be described on the basis of FIG. 3 to FIG. 5. Note that FIG. 3 is a flowchart illustrating the display processing by the display device 100 according to the present embodiment. FIG. 4 is an explanatory diagram illustrating one example of three-dimensional images and the OSD images displayed on the display unit 140. FIG. 5 is an explanatory diagram illustrating manipulation for moving a part of the OSD images of FIG. 4.

In the present embodiment, as one example of the image stereoscopically displayed on the display unit 140, a situation will be considered in which 3D images 300 and OSD images 310, which are images (content images) of a television program, a movie, a game or the like, are displayed as illustrated in FIG. 4. The user is assumed to view the image from the front side of FIG. 4. The 3D images 300 are composed of a house 302 and trees 304, 306. Further, the OSD images 310 includes an icon 312 for carrying out an event associated therewith, and explanatory characters 314 of the displayed 3D images 300. These OSD images are preferably displayed so as not to obstruct the display of the 3D images 300, but are sometimes displayed at the back side of the 3D images so as to make the content invisible as illustrated in FIG. 4.

Therefore, the display device 100 according to the present embodiment makes it possible that the user can move the OSD images 310 displayed at the back side of the 3D images 300 with a hand in order to make the information of the OSD images 310 visible.

First, the user performs the manipulation input for selecting the image to be manipulated, of which the display position is desired to be changed, from among the displayed images, with the manipulation body (for example, a hand) (S100). In the present embodiment, for example, the action of pinching the displayed image with a hand is the action of selection. The user performs the action of pinching the image to be moved, from among the images displayed in the space in front of the display unit 140. For example, when the explanatory characters 314 by OSD illustrated in FIG. 4 is to be moved toward the front side (z axis positive direction side) up to a position where the user can view the explanatory characters 314, the user moves the hand to the position at which the explanatory characters 314 are displayed and performs the action of pinching the image.

At this time, the input detection unit 110 keeps detecting the position of the manipulation body, and if the input detection unit 110 detects the manipulation body, the manipulation position calculation unit 122 determines whether or not the action of selecting the image of the manipulation object (for example, the action of pinching the image) is performed on the basis of the manipulation position information of the manipulation body. The identification of the image of the manipulation object is able to be achieved, for example, by checking and comparing the manipulation position information of the manipulation body and the parallax information of the display unit 140 as described above. When the manipulation position information of the manipulation body is identical with the parallax information of the display unit 140, it is determined that the user has identified the image displayed at the position as the manipulation object (S110).

Upon identifying the image of the manipulation object, the manipulation position calculation unit 122 calculates the manipulation position information of the manipulation body based on the detection result from the input detection unit 110, and monitors whether or not the action of moving the manipulation body and of releasing the image of the manipulation object are performed. The manipulation object target display position calculation unit 124 calculates the display position information for displaying the image of the manipulation object at the position of the manipulation body, based on the manipulation position information of the manipulation body calculated by the manipulation position calculation unit 122 (S120). The image processing unit 130 displays the 3D images 300 and the OSD images 310 on the display unit 140 on the basis of the display position information of the image of the manipulation object (S130).

On the other hand, the manipulation position calculation unit 122 determines whether or not the action of the manipulation body for ending the movement of the image of the manipulation object is performed, on the basis of the detection result of the input detection unit 110 (S140). An action of ending the movement of the image of the manipulation object is, for example, an action of releasing. The action of releasing the image is able to be recognized, for example, by a recognition condition inverse to the recognition condition for the action of pinching the image, that is, at the time point when one manipulation body region detected by the input detection unit 110 becomes two or more manipulation body regions. When it is determined that the action of releasing the image is performed in step S140, the image of the manipulation object is left displayed at the display position of the time point when the user released the image, and the process of FIG. 3 is ended. On the other hand, when it is determined that the action of releasing the image is not performed in step S140, the process from step S120 is repeated.

For example, in FIG. 4, when the explanatory characters 314 at the back side of the 3D image 300 are moved, the user pinches the image at the position where the explanatory characters 314 are displayed, and moves the hand in a pinching state to the front side (z axis positive direction side), as illustrated in FIG. 5. Thereby, the explanatory characters 314 are also moved in response to change in the position of the hand. Then, if the hand releases the image when the explanatory characters 314 is positioned at the front side of the 3D image 310, the explanatory characters 314, which have been the manipulation object, are fixed at the position where the releasing action of the hand is performed. In this way, the display position of the image is able to be changed in response to the movement of the user's hand.

Although the explanatory characters 314, which are an OSD image 310, are moved only in the depth direction (z direction) in the example illustrated in FIG. 4 and FIG. 5, the present technology is not limited to the example. By moving the position of the manipulation body, the image of the manipulation object is also able to be moved in x direction and y direction.

Further, regarding the movement of the image of the manipulation object, the movement may be allowed only within the range of a movable region provided in the depth direction (z direction). The movable range is, for example, a range within which three-dimensional images are displayed in an easily viewable manner, or a range within which three-dimensional images are displayed clearly. When the user tries to move the image of the manipulation object beyond the movable region, the display device 100 may notify the user that the movable region is exceeded, with a popup sign or a sound. Thereby, the user is prompted to change the moving direction of the image of the manipulation object.

<2. Second Embodiment>

Figure 6:
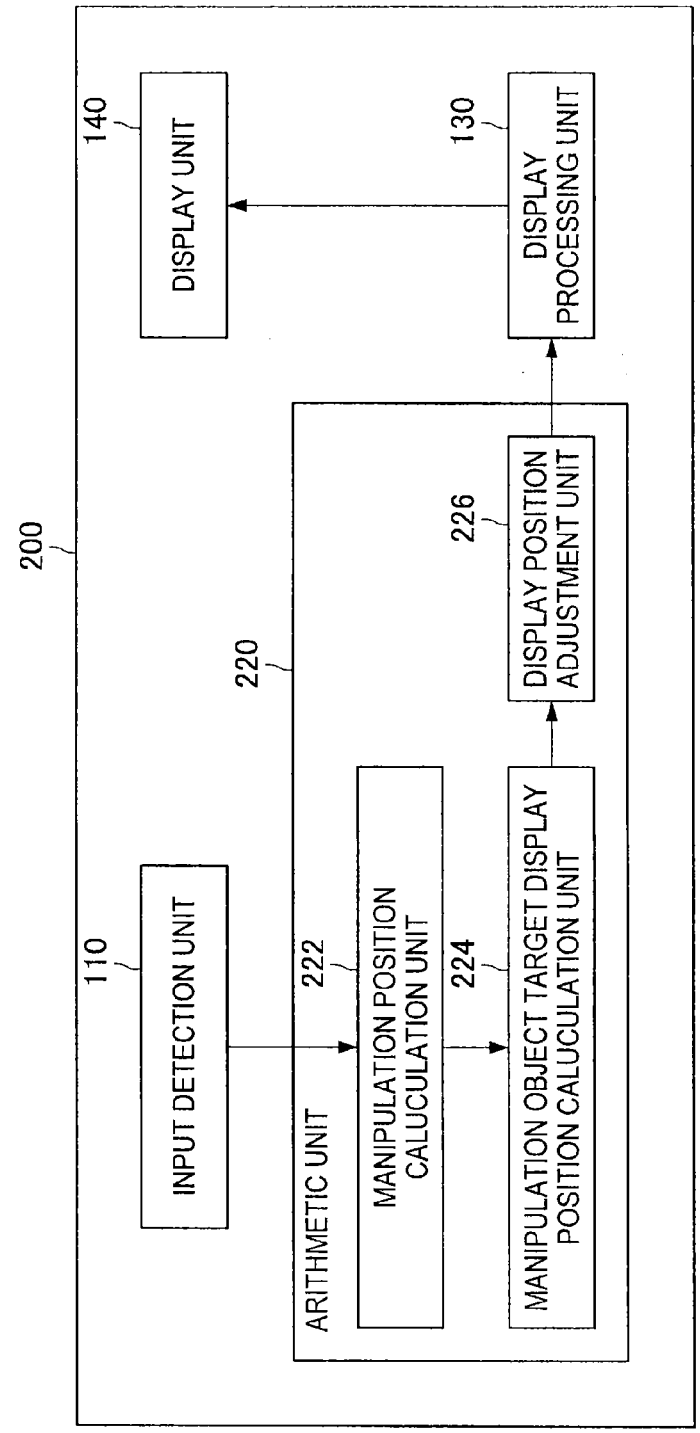
FIG. 6 is a functional block diagram illustrating a functional configuration of a display device according to a second embodiment of the present disclosure.
Figure 7:
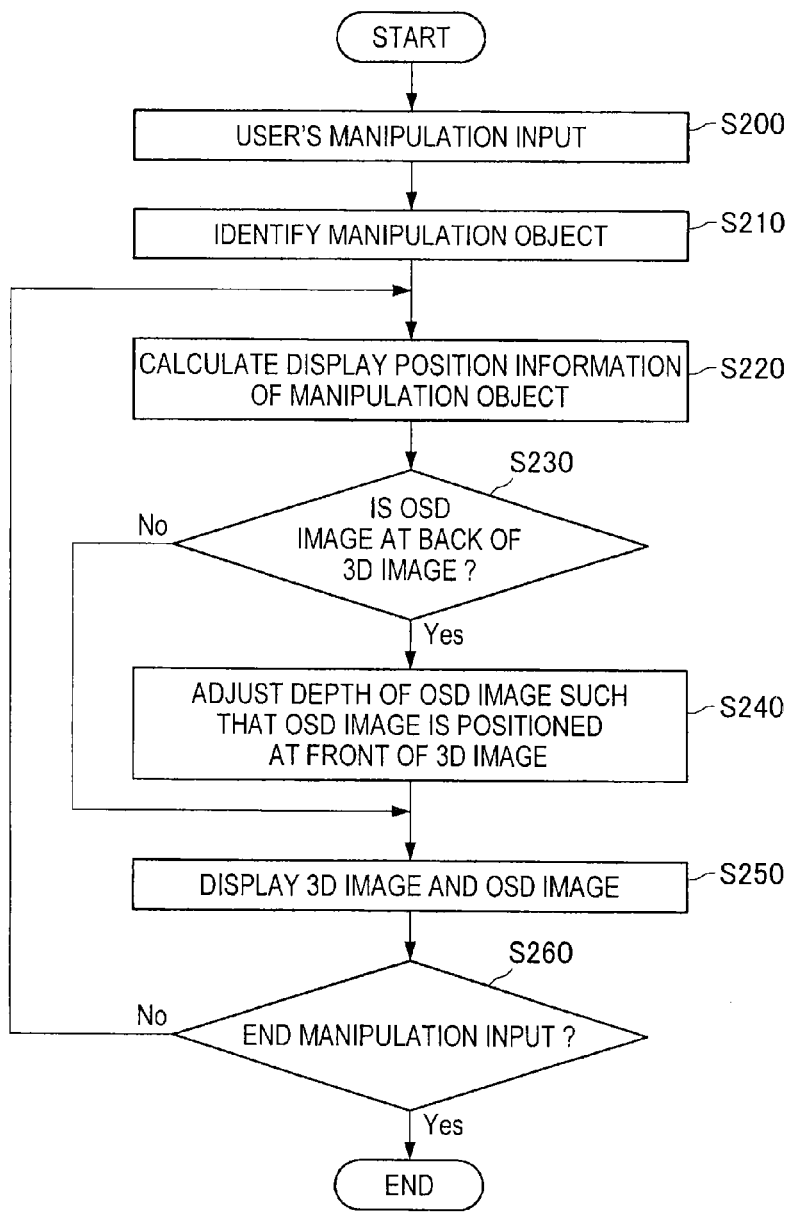
FIG. 7 is a flowchart illustrating display processing by the display device according to the same embodiment.

Next, on the basis of FIG. 6 and FIG. 7, a display device 200 including an information processing apparatus according to the second embodiment of the present disclosure will be described. The display device 200 is different, as compared to the display device 100 of the first embodiment, in that the display position of the image of the manipulation object, when in a state not viewable due to overlapping with another image (3D image 300 or OSD image 310), is automatically adjusted when the user moves the image of the manipulation object. In the following, description will be made of the configuration and the function of the display device 200 according to the present embodiment, and mainly of different points from the display device 100 according to the first embodiment.

[2-1. Functional Configuration]

First, on the basis of FIG. 6, the functional configuration of the display device 200 according to the present embodiment will be described. Note that FIG. 6 is a functional block diagram illustrating the functional configuration of the display device 200 according to the present embodiment. As illustrated in FIG. 2, the display device 100 according to the present embodiment includes an input detection unit 110, an arithmetic unit 220, a display processing unit 130, and a display unit 140. The input detection unit 110, the display processing unit 130, and the display unit 140 have the same functions as the first embodiment, and the description is omitted here. In the present embodiment, the arithmetic unit 220 and the display processing unit 130 function as an information processing apparatus for executing display processing for adjusting the display position of the three-dimensional image.

The arithmetic unit 220 identifies the position of the manipulation body on the basis of the detection result from the input detection unit 110, and calculates the target display position of the image that is the manipulation object. The arithmetic unit 220 includes a manipulation position calculation unit 222, a manipulation object manipulation position calculation unit 224, and a display position adjustment unit 226.

The manipulation position calculation unit 222 and the manipulation object manipulation position calculation unit 224 function in the same manner as the manipulation position calculation unit 122 and the manipulation object manipulation position calculation unit 124 according to the first embodiment. The manipulation position calculation unit 222 calculates the position of the manipulation body from the detection result of the input detection unit 110, and outputs it to the manipulation object target display position calculation unit 224. Further, the manipulation object target display position calculation unit 224 calculates the position at which the image of the manipulation object is to be displayed, in response to the change of the manipulation position information of the manipulation body, and outputs it to the display position adjustment unit 226.

The display position adjustment unit 226 adjusts the target display position of the image of the manipulation object, to the position at which the image of the manipulation object is to be displayed, which is calculated by the manipulation object target display position calculation unit 224, and to position relationship in the depth direction in relation to other images displayed on the display unit 140. Even after the user changes the display position of the image of the manipulation object, the image of the manipulation object sometimes remains located at the back side of the other images, which results in the image of the manipulation object not viewable. Therefore, the display position adjustment unit 226 compares the positions in the depth direction of the manipulation object moved by the user and of other images displayed on the display unit 140, and if the manipulation object is positioned at the back side of other images, automatically adjusts to make the manipulation object to be displayed at the front side of other images.

The automatic adjustment of the target display position by the display position adjustment unit 226 may be conducted in such a manner to display the image of the manipulation object at the most front, or in such a manner to position the same at the most front within a range of a movable region provided in the depth direction (z direction). For example, in the three-dimensional images, if the positions of the user and an image become too close, the image becomes difficult to be viewed. Therefore, the image of the manipulation object may be adjusted within a range that provides an image easy to be viewed. Further, when there is a region where three-dimensional images are not recognized clearly, the target display position of the image of the manipulation object may be adjusted within a range where the manipulation object does not move into the region.

Upon adjusting the target display position of the image of the manipulation object, the display position adjustment unit 226 outputs the target display position information after adjustment, to the display processing unit 130. The display processing unit 130 causes the display unit to display the three-dimensional image on the basis of the display position information.

[2-2. Display Processing]

Next, on the basis of FIG. 7, display processing by the display device 200 according to the present embodiment will be described. Note that FIG. 7 is a flowchart illustrating the display processing by the display device 100 according to the present embodiment.

In the display processing in the present embodiment, likewise the first embodiment, the user first performs the manipulation input for selecting the image to be manipulated, of which the display position is desired to be changed, from among the displayed images, with the manipulation body (for example, a hand) (S200). In the present embodiment, the selection action is, for example, an action of pinching a displayed image with a hand. The user performs the action of pinching the image to be moved, from among the images displayed in the space in front of the display unit 140.

During this, the input detection unit 110 keeps detecting the position of the manipulation body, and if the input detection unit 110 detects the manipulation body, the manipulation position calculation unit 222 determines whether or not the action of selecting the image of the manipulation object (for example, the action of pinching the image) is performed, on the basis of the manipulation position information of the manipulation body. Likewise the first embodiment, the identification of the image of the manipulation object is able to be achieved by checking and comparing the manipulation position information of the manipulation body and the parallax information of the display unit 140. When the manipulation position information of the manipulation body is identical with the parallax information of the display unit 140, it is determined that the user has identified the image displayed at the position as the manipulation object (S210). For example, in the example of FIG. 4, it is determined that explanatory characters 314, which are an OSD image 310, are identified as the manipulation object.

Upon identifying the image of the manipulation object, the manipulation position calculation unit 222 calculates the manipulation position information of the manipulation body based on the detection result from the input detection unit 110, and monitors whether or not the action of moving the manipulation body and of releasing the image of the manipulation object are performed. The manipulation object target display position calculation unit 224 calculates the display position information for displaying the image of the manipulation object at the position of the manipulation body, based on the manipulation position information of the manipulation body calculated by the manipulation position calculation unit 122 (S220).

On the other hand, the manipulation position calculation unit 222 determines whether or not the action of the manipulation body for ending the movement of the image of the manipulation object, on the basis of the detection result of the input detection unit 110. An action of ending the movement of the image of the manipulation object is, for example, an action of releasing. When it is determined that the action of releasing the image is performed, the display position adjustment unit 226 determines whether or not the image of the manipulation object is at the back side (z axis negative direction side) of other images.

For example, in the example of FIG. 4, when the explanatory characters 314, which are the OSD image 310, are selected as the manipulation object, it is determined whether other images (at least 3D images 300) are at the front side of the display position of the explanatory characters 314 after moved by the user. This is conducted to make the content of the explanatory characters 314 viewable by the user, and if other images are at the front side of the explanatory characters 314, the display position of the explanatory characters 314 in the depth direction is adjusted in such a manner that the explanatory characters 314 are positioned at the front of other images (3D images 300) (S240). Note that, if the explanatory characters 314 are at the most front, the display position of the explanatory characters 314 is not changed.

Thereafter, the image processing unit 130 causes the display unit 140 to display the 3D images 300 and the OSD images 310 on the basis of the display position information of the image of the manipulation object adjusted by the display position adjustment unit 226 (S250).

Further, the manipulation position calculation unit 222 determines whether or not the action of the manipulation body for ending the movement of the image of the manipulation object is performed, on the basis of the detection result of the input detection unit 110 (S260). The action of ending the movement of the image of the manipulation object is, for example, an action of releasing. When it is determined that the action of releasing the image is performed in step S260, the image of the manipulation object is left in a state displayed in step S250, and the process of FIG. 7 is ended. On the other hand, when it is determined that the action of releasing the image is not performed in step S260, the process from step S220 is repeated.

In the above, the display processing by the display device 200 according to the present embodiment is described. According to the present embodiment, by pinching, selecting, and moving an arbitrary image with a hand from among the images displayed as three-dimensional images, the display position of the image is able to be adjusted intuitively. Further, in the present embodiment, when the image of the manipulation object is buried in other images even after moved by the user, the image of the manipulation object is automatically adjusted to be displayed at the front side. Thereby, the user can view the image of the manipulation object unfailingly.

Note that, also in the present embodiment, the explanatory characters 314, which are the OSD image 310, may be moved not only in the depth direction (z direction), but the image of the manipulation object may be moved also in x direction and y direction at the time of the manipulation by the manipulation body and at the time of the automatic correction.

<3. Variant Example>

[3-1. Regarding Image that is Manipulation Object]

Figure 8:
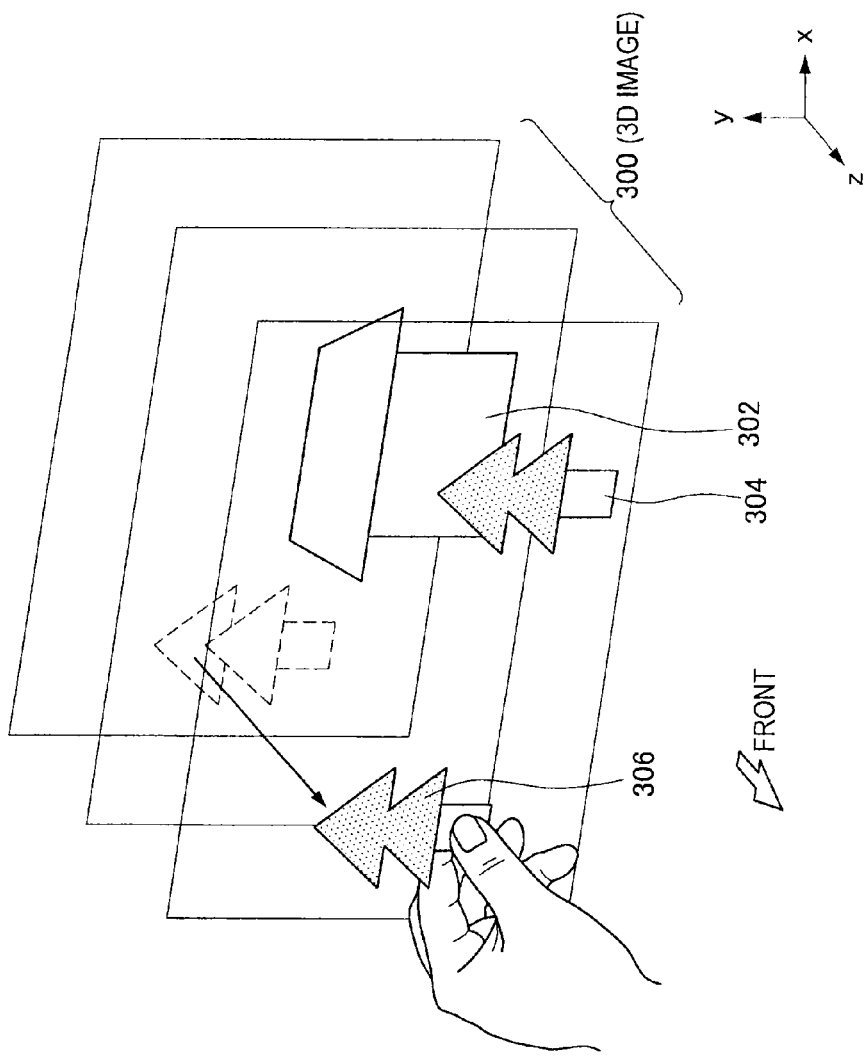
FIG. 8 is an explanatory diagram illustrating manipulation for moving a part of 3D images.

In the above embodiments, description is made of a case where the OSD image 310 such as a menu, an icon, or a characteristic explanation, among the three-dimensional images, is moved as illustrated in FIG. 4 and FIG. 5, but the present technology is not limited to the example. For example, as illustrated in FIG. 8, a part of the image for composing the 3D images 300 may be moved. In the example of FIG. 8, the tree 306 for composing the 3D images 300 is pinched by a hand, and is moved to the front side. The process of the display device at this time may employ any method in the above embodiments. Further, the image of the manipulation object may be moved not only to the front side, but also to the back side. Thereby, the image of the manipulation object is able to be intentionally hidden in other images. In this way, by using the display processing of the above embodiments, the display position is able to be changed flexibly for each image.

[3-2. Selection of Image that is Manipulation Object]

In the above embodiments, the description is made of a case where the action of pinching the image desired to be moved with a hand is performed as the action of selecting the image to be manipulated, but the present technology is not limited to the example. For example, an action of quickly shaking a finger in a predetermined direction (for example, up and down, left and right, or the like) over the image to be manipulated among the three-dimensional images displayed on the display unit 140 may be the action of selecting the image of the manipulation object. Alternatively, manipulation of moving the manipulation body to surround the image to be selected with a frame of a circle, a square, or the like may be the action of selecting the image of the manipulation object.

The action of shaking a finger or surrounding the image of the manipulation object may be in advance stored by the user in the storage unit (not shown in the drawings) of the display device as an arbitrary gestural manipulation. The arbitrary gesture is, for example, shaking a finger up and down twice and thereafter left and right once over the image to be manipulated, or the like. By setting the arbitrary gestural manipulation as above, the image of the manipulation object is able to be selected by a manipulation of the user's preference.

Further, one image may be selected as a manipulation object, or a plurality of images may be selected as a manipulation object. When a plurality of images are the manipulation objects, for example, these images are able to be selected by moving the manipulation body in such a manner that the plurality of the images are surrounded by one frame. Then, by moving the manipulation body, the plurality of the selected images are able to be moved simultaneously, At this time, regarding the movement of each image, the movement may be carried out by the movement amount of the manipulation body. To the same position as the position in the depth direction of a certain image of the manipulation object (for example, the image displayed at the most front side, the image selected first, the image pinched by the user, or the like) after the movement, other images of the manipulation object may be moved.

<4. Example of Hardware Configuration>

Figure 9:
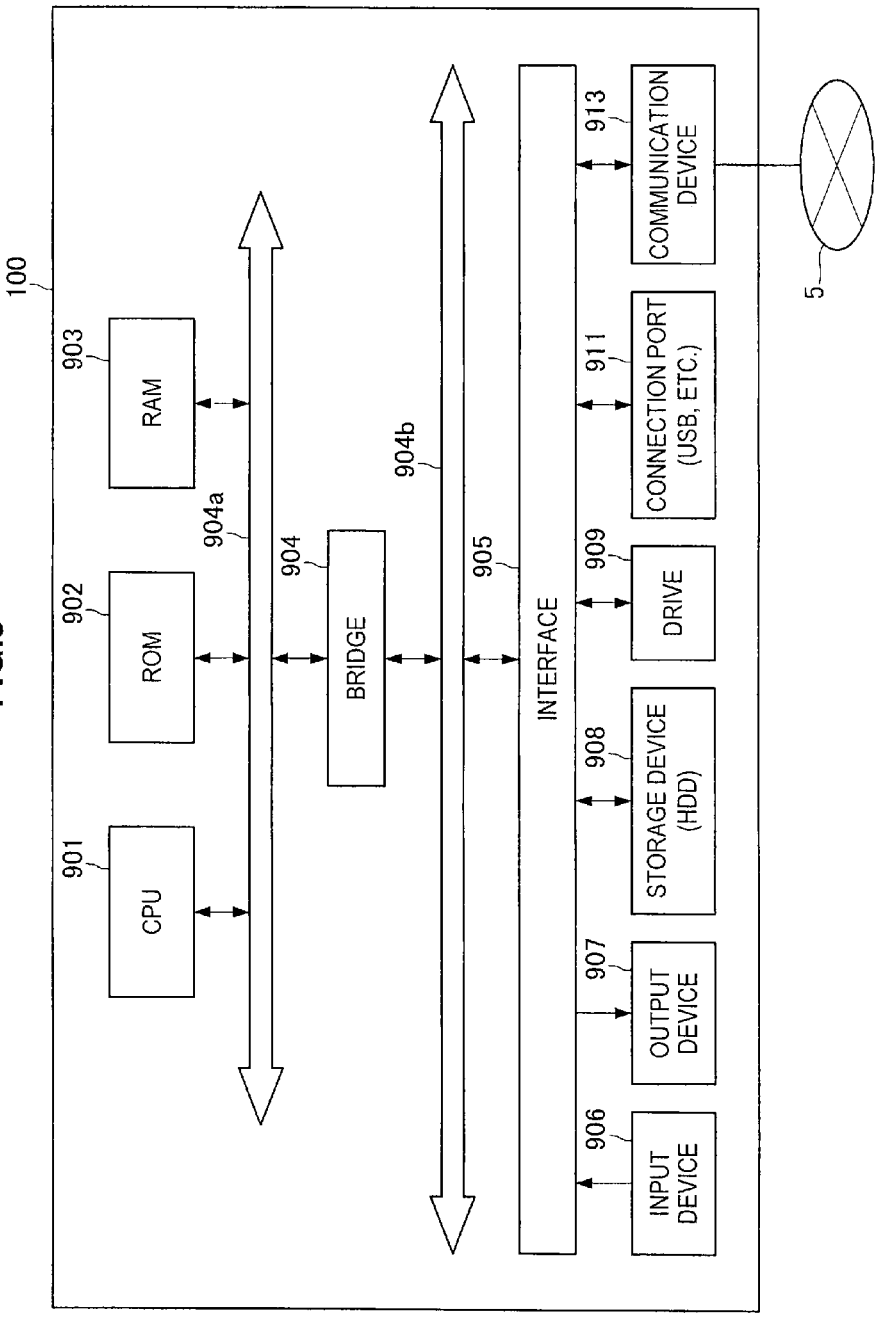
FIG. 9 is a hardware configuration diagram illustrating one example of a hardware configuration of the display device according to the same embodiment.

The process by the display device 100 according to the present embodiment may be executed by hardware, and may be executed by software. In this case, the display device 100 may be configured as illustrated in FIG. 9. In the following, on the basis of FIG. 9, one example of a hardware configuration of the display device 100 according to the present embodiment will be described. Note that the display device 200 illustrated in FIG. 6 is able to be configured in the same way.

The display device 100 according to the present embodiment is able to be realized by a processing device such as a computer and the like, as described above. As illustrated in FIG. 9, the display device 100 includes a CPU (Central Processing Unit) 901, a ROM (Read Only Memory) 902, a RAM (Random Access Memory) 903, and a host bus 904a. Further, the display device 100 includes a bridge 904, an external bus 904b, an interface 905, an input device 906, an output device 907, a storage device (HDD) 908, a drive 909, a connection port 911, and a communication unit 913.

The CPU 901 functions as an arithmetic processing device and a control device, and controls general actions in the display device 100 in accordance with various programs. Further, the CPU 901 may be a microprocessor. The ROM 902 stores programs, arithmetic parameters and the like for use by the CPU 901. The RAM 903 temporarily stores programs executed by the CPU 901, parameters changed as appropriate in the execution, and the like. These are mutually interconnected by the host bus 904a composed of a CPU bus and others.

The host bus 904a is connected via the bridge 904 to the external bus 904b such as a PCI (Peripheral Component Interconnect/Interface) bus. Note that the host bus 904a, the bridge 904, and the external bus 904b do not necessarily need to be configured separately, but these functions may be implemented in one bus.

The input device 906 is composed of input means for the user to input information, such as a mouse, a keyboard, a touch panel, a button, a microphone, a switch, and a lever, and an input control circuit for generating an input signal based on input by the user and for outputting it to the CPU 901. The output device 907 includes, for example, a display device such as a liquid crystal display (LCD) device, an OLED (Organic Light Emitting Diode) device, and a lamp, and a sound output device such as a speaker.

The storage device 908 is one example of the storage unit of the display device 100, and is a device for storing data. The storage device 908 may include a storage medium, a recording device for recording data in the storage medium, a reading device for reading data from the storage medium, and a deleting device for deleting data recorded in the storage medium. For example, the storage device 908 is composed of HDD (Hard Disk Drive). This storage device 908 drives a hard disk, and stores programs that the CPU 901 executes and various data.

The drive 909 is a storage medium reader writer, which is built in or externally attached to the display device 100. The drive 909 reads information recorded in a removable recording medium such as a magnetic disk, an optical disc, a magneto-optical disk, or a semiconductor memory, and outputs it to the RAM 903.

The connection port 911 is an interface connectable to external devices, and is a connection port to the external devices, which is capable of transmitting data via USB (Universal Serial Bus) and the like, for example. Further, the communication unit 913 is a communication interface composed of a communication device and others for connecting to a communication network 5, for example. Further, the communication unit 913 may be a wireless LAN (Local Area Network) compatible communication device, a wireless USB compatible communication device, or a wire communication device that performs communication by wire.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

For example, in the above embodiments, the display device is provided with the arithmetic unit and the display processing unit, but the present technology is not limited to the example. For example, for example, it may be such that the arithmetic unit and the display processing unit are provided in a gadget communicably connected to the display device including the input detection unit and the display unit, and the gadget calculates each display position of three-dimensional images to be displayed on the display unit, and the display unit is caused to display the three-dimensional images on the basis of the calculated display positions.

Additionally, the present technology may also be configured as below.

(1)

An information processing apparatus comprising:

an input detection unit configured to detect a position of a manipulation body for inputting manipulation in a three dimensional space;

an arithmetic unit configured to identify a manipulation object image to be manipulated, from among three-dimensional images displayed on a display unit, and calculate a target display position of the manipulation object image, on the basis of a detection result by the input detection unit; and a display processing unit configured to cause the display unit to display the manipulation object image at the target display position calculated by the arithmetic unit.

(2)

The information processing apparatus according to (1), wherein the arithmetic unit includes a manipulation position calculation unit configured to calculate the position of the manipulation body relative to the display unit and identify the manipulation object image on the basis of the detection result of the input detection unit, and a manipulation object target display position calculation unit configured to calculate the target display position of the manipulation object image on the basis of a position change of the manipulation body.

(3)

The information processing apparatus according to (2), wherein the manipulation position calculation unit determines whether or not a selection action of selecting the manipulation object image is performed, on the basis of the detection result of the input detection unit, and identifies, as the manipulation object image, at least a part of the three-dimensional images displayed on the display unit and having the same display position as the position of the manipulation body when the selection action is performed.

(4)

The information processing apparatus according to any one of (1) to (3), wherein the arithmetic unit calculates the target display position of the manipulation object image at least in a depth direction.

(5)

The information processing apparatus according to any one of (1) to (4), further including:

a display position adjustment unit configured to compare the target display position of the manipulation object image with display positions of other three-dimensional images, and automatically adjust the target display position of the manipulation object image.

(6)

The information processing apparatus according to (5), wherein the display position adjustment unit adjusts the target display position in such a manner that the manipulation object image is displayed at a front side of the other three-dimensional images, when the manipulation object image after being moved by the manipulation body is positioned at a back side of the other three-dimensional images.

(7)

The information processing apparatus according to any one of (1) to (6), wherein the manipulation object image is movable only within a movable region within which the manipulation object image is movable.

(8)

The information processing apparatus according to any one of (1) to (7), wherein the three-dimensional images include a content image displayed three-dimensionally and an OSD image displayed with the content image, and the manipulation object image is the OSD image.

REFERENCE SIGNS LIST 100, 200 display device
102 3D display
104 input detection device
110 input detection unit
120, 220 arithmetic unit 122, 222 manipulation position calculation unit
124, 224 manipulation object target display position calculation unit
130 display processing unit
140 display unit
226 display position adjustment unit
300 3D image
310 OSD image

The invention claimed is:

1. An information processing apparatus, comprising:
a Central Processing Unit (CPU) configured to:
identify a manipulation object image for manipulation from three-dimensional images on a display unit, based on a first user input;
determine a target display position of the manipulation object image based on a second user input;
determine the manipulation object image is not viewable at the target display position;
adjust the target display position in a depth direction based on the determination that the manipulation object image is not viewable at the target display position, such that the manipulation object image is positioned at a front side of at least one of the three-dimensional images and is viewable; and
control the display unit to display the manipulation object image at the adjusted target display position.

2. The information processing apparatus according to claim 1, wherein the CPU is further configured to:
determine a detected position of a manipulation body relative to the display unit, wherein the manipulation body inputs the manipulation in a three-dimensional space;
identify the manipulation object image based on a detection result, wherein the detection result corresponds to the detected position; and
determine the target display position of the manipulation object image based on a position change of the manipulation body.

3. The information processing apparatus according to claim 2, wherein the CPU is further configured to:
determine selection of the manipulation object image, based on the detection result; and
identify, as the manipulation object image, at least one image of the three-dimensional images on the display unit based on the selection of the manipulation object image, wherein the at least one image has a same display position as the detected position of the manipulation body.

4. The information processing apparatus according to claim 1, wherein the CPU is further configured to:
compare the target display position of the manipulation object image with display positions of the three-dimensional images other than the manipulation object image; and
adjust the target display position of the manipulation object image based on the comparison.

5. The information processing apparatus according to claim 1, wherein the manipulation object image is movable within a movable region.

6. An information processing method, comprising:
identifying a manipulation object image for manipulation from three-dimensional images on a display unit, based on a first user input;
determining a target display position of the manipulation object image based on a second user input;
determining the manipulation object image is not viewable at the target display position;
adjusting the target display position in a depth direction based on the determination that the manipulation object image is not viewable at the target display position, such that the manipulation object image is positioned at a front side of at least one of the three-dimensional images and is viewable; and
controlling the display unit to display the manipulation object image at the adjusted target display position.

7. A non-transitory computer-readable storage medium having stored thereon computer-executable instructions, which when executed by a computer, causes the computer to execute operations, the operations comprising:
identifying a manipulation object image for manipulation from three-dimensional images on a display unit, based on a first user input;
determining a target display position of the manipulation object image based on a second user input;
determining the manipulation object image is not viewable at the target display position;
adjusting the target display position in a depth direction based on the determination that the manipulation object image is not viewable at the target display position, such that the manipulation object image is positioned at a front side of at least one of the three-dimensional images and is viewable; and
controlling the display unit to display the manipulation object image at the adjusted target display position.

8. The information processing apparatus according to claim 1, wherein the CPU is further configured to:
detect a plurality of manipulation body regions; and
identify the manipulation object image based on the plurality of manipulation body regions that become one manipulation body.

9. The information processing apparatus according to claim 2, wherein the manipulation body inputs the manipulation in the three-dimensional space by at least one of a pinching operation, a moving operation, or a releasing operation.

10. The information processing apparatus according to claim 1, wherein
the three-dimensional images include at least one content image and an on screen display (OSD) image, and
the OSD image includes at least one of icons or explanatory characters related to the at least one content image.

11. The information processing apparatus according to claim 1, wherein
the second user input is based on a detection result, and
the detection result corresponds to a detected position of a manipulation body that inputs the manipulation in a three-dimensional space.

12. The information processing apparatus according to claim 1, wherein the CPU is further configured to:
determine the manipulation object image is at a back side of at least one of the three-dimensional images other than the manipulation object image; and
adjust the target display position based on the determination that the manipulation object image is at the back side of the at least one of the three-dimensional images other than the manipulation object image.

13. The information processing apparatus according to claim 1, wherein
the three-dimensional images include at least one content image and an on screen display (OSD) image, and
the manipulation object image is the OSD image.

14. The information processing apparatus according to claim 13, wherein the CPU is further configured to:

determine the OSD image is not viewable, and the OSD image is at a back side of the at least one content image; and adjust the target display position based on the determination that the OSD image is not viewable and the OSD image is at the back side of the at least one content image, such that the OSD image is positioned where the OSD image is viewable.

* * * * *